United States Patent
Holch et al.

(10) Patent No.: US 6,280,328 B1
(45) Date of Patent: *Aug. 28, 2001

(54) CASHLESS COMPUTERIZED VIDEO GAME SYSTEM AND METHOD

(75) Inventors: Niels C. Holch, Annapolis, MD (US); Frank J. Riolo, Rome, NY (US)

(73) Assignee: Oneida Indian Nation, Vernon, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/877,375

(22) Filed: Jun. 17, 1997

Related U.S. Application Data

(63) Continuation-in-part of application No. 08/719,651, filed on Sep. 25, 1996, now Pat. No. 5,674,128.

(51) Int. Cl.[7] ................................. A63F 9/24; A63F 3/06
(52) U.S. Cl. ............................. 463/42; 463/18; 463/19; 463/22
(58) Field of Search ........................... 463/10, 16, 17, 463/18, 19, 22, 25, 29, 42

(56) References Cited

U.S. PATENT DOCUMENTS

| | | |
|---|---|---|
| 4,240,635 | 12/1980 | Brown . |
| 4,283,709 | 8/1981 | Lucero et al. . |
| 4,335,809 | 6/1982 | Wain . |
| 4,339,798 | 7/1982 | Hedges et al. . |
| 4,467,424 | 8/1984 | Hedges et al. . |
| 4,494,197 | 1/1985 | Troy et al. . |
| 4,575,622 | 3/1986 | Pellegrini . |
| 4,636,951 | 1/1987 | Harlick . |
| 4,648,600 | 3/1987 | Olliges . |
| 4,669,730 | 6/1987 | Small . |
| 4,760,527 | 7/1988 | Sidley . |
| 4,815,741 | 3/1989 | Small . |
| 4,856,787 | 8/1989 | Itkis . |
| 4,880,237 | 11/1989 | Kishishita . |
| 4,882,473 | 11/1989 | Bergeron et al. . |
| 4,926,327 | 5/1990 | Sidley . |

(List continued on next page.)

FOREIGN PATENT DOCUMENTS

WO 89/06998  8/1989  (WO) .

OTHER PUBLICATIONS

Pot–O–Gold, "19" Touchscreen Multi–Game Terminal Toucheasy Keno© Play Description."
Pot–O–Gold, "19" Touchscreen Multi–Game Terminal Superpick Lotto© Play Description."
Pot–O–Gold, "19" Touchscreen Multi–Game Terminal Touch 6 Lotto© Play Description."
Pot–O–Gold, "19" Touchscreen Multi–Game Terminal Touch 6 Lotto© Technical Description."

(List continued on next page.)

Primary Examiner—Jessica J. Harrison
(74) Attorney, Agent, or Firm—Finnegan, Henderson, Farabow, Garrett & Dunner, L.L.P.

(57) ABSTRACT

A coinless video game system includes a plurality of electronic video game terminals, a game server corresponding to each player terminal, and a central control network for administering and controlling games and player accounts. A player initially establishes a player account in the central control network and receives a player I.D. card bearing the player's account number and other relevant information. Players use these I.D. cards to establish sessions at a player terminal. The server provides a random number to each player terminal at predefined intervals to determine wins and loses for each game selected by a player. Waged amounts are then debited or credited to a player's account in the central control network. Players may redeem any account balance from a cashier associated with the central control network. Additionally the central controller keeps track of all player activity information.

52 Claims, 5 Drawing Sheets

U.S. PATENT DOCUMENTS

| | | |
|---|---|---|
| 5,038,022 | 8/1991 | Lucero . |
| 5,119,295 | 6/1992 | Kapur . |
| 5,159,549 | 10/1992 | Hallman, Jr. et al. . |
| 5,179,517 | 1/1993 | Sarbin et al. . |
| 5,197,094 | 3/1993 | Tillery et al. . |
| 5,223,698 | 6/1993 | Kapur . |
| 5,265,874 | 11/1993 | Dickinson et al. . |
| 5,287,269 | 2/1994 | Dorrough et al. . |
| 5,297,802 | 3/1994 | Pocock et al. . |
| 5,324,035 | 6/1994 | Morris et al. . |
| 5,326,104 | 7/1994 | Pease et al. . |
| 5,332,076 | 7/1994 | Ziegert . |
| 5,371,345 | 12/1994 | LeStrange et al. . |
| 5,408,417 | 4/1995 | Wilder ................................ 364/479 |
| 5,429,361 | 7/1995 | Raven et al. . |
| 5,613,912 | 3/1997 | Slater .................................... 463/25 |
| 5,655,961 | 8/1997 | Acres et al. . |
| 5,674,128 | 10/1997 | Holch et al. . |
| 5,722,890 * | 3/1998 | Libby et al. ........................... 463/17 |
| 5,755,621 | 5/1998 | Marks et al. .......................... 463/42 |
| 5,762,552 | 6/1998 | Vuong et al. .......................... 463/25 |
| 5,770,533 | 6/1998 | Franchi ................................. 463/42 |
| 5,797,794 * | 8/1998 | Angell ................................... 463/18 |
| 5,800,269 * | 9/1998 | Holch et al. ........................... 463/42 |
| 5,823,879 | 10/1998 | Goldberg et al. ...................... 463/42 |
| 5,830,068 | 11/1998 | Brenner et al. ........................ 463/42 |
| 5,836,817 | 11/1998 | Acres et al. ........................... 463/26 |
| 5,917,725 | 6/1999 | Thacher et al. ................... 364/410.1 |
| 5,949,411 | 9/1999 | Doerr et al. .......................... 345/327 |

FOREIGN PATENT DOCUMENTS

Pot–O–Gold, "19" Touchscreen Multi–Game Terminal Supergold Bingo© Play Description."
Casinolink, Mikohn WorldWide.
Casinolink System, Mikohn WorldWide.
Casino Systems Solutions, IGT International Game Technology.
Quicktrack, Quick Track Gaming, Inc.
Safejack, Mikohn WorldWide.
Oasis II, CDS Systems and Services.
The Future of Gaming Today, Casino Data Systems.
Welcome to Casino Data Systems, Casino Data Systems.
Bally Systems, Introducing A World Of Opportunities.
Advanced Computer Services, Software Offerings.

* cited by examiner

CASHLESS COMPUTERIZED VIDEO GAME SYSTEM AND METHOD

RELATED APPLICATIONS

This application is a continuation-in-part of U.S. patent application Ser. No. 08/719,651, filed Sep. 25, 1996, now U.S. Pat. No. 5,674,128, the contents of which are hereby incorporated by reference.

BACKGROUND OF THE INVENTION

This invention relates generally to the field of computer-controlled games, and more particularly to the field of control of banks of gaming devices and automated player tracking.

Electronic gambling is a popular activity. The parent application discusses a gambling system with terminals enabling players to choose from several games. Additionally, it keeps track of information deemed important by gaming establishments. The accumulated game information may be used to generate standard or customized reports for the gaming establishments. Periodic reports provide valuable information to the gaming establishments.

As in other businesses, comprehensive customer information such as player demographics and player activities are of great value to gaming establishments. Player information may be used for a wide array of purposes. The most ubiquitous application is marketing. Another is providing up-to-date information about each player at anytime. Gaming establishments may, for example grant special incentives electronically to players exhibiting certain playing habits during the player's game. Additionally, instantaneous information would help gaming establishments detect fraud while it is occurring by reviewing comprehensive and current gaming information of a suspected player.

SUMMARY OF THE INVENTION

Accordingly, it is an object of this invention to provide a gaming device that maximizes the value of player information.

It is another object of this invention to provide a alternative embodiments of controlling the games at the player terminals.

Additional features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

To achieve these and other advantages and in accordance with the purposes of the invention, as embodied and broadly described, the invention defines a system for operating several electronic games for a plurality of players comprising a plurality of player terminals coupled together. Each terminal includes means for receiving player identification information from a participating one of the players, means for receiving game selection information from the participating player indicating one of the plurality of games, a video display for displaying a selected one of the games to the participating player, and means for executing software application programs corresponding to a plurality of games in response to an externally-generated set of random numbers to determine the result of the selected game independent of player participation at other ones of the player terminals. The system also includes a game server connected to each of the plurality of player terminals. The game server includes means for sending to the player terminals the set of random numbers as externally-generated random numbers. Also, the system includes a central controller connected to each of the player terminals. The central controller includes means for storing player account information for each of the players, and means for adjusting the account information of the players according, to the result of the games from the player terminal.

In accordance with the purposes of the invention, as embodied and broadly described, the invention also includes a method of operating electronic games in a system including a central controller, a game server, and a plurality of player terminals. First, a player account file is established at a central controller for a participating player. A player terminal, coupled to the central controller, receives player identification information input by the participating player, and a video display of the player terminal displays a plurality of games of chance. Next, the player terminal receives information for a selected one of the plurality of games and a game server sends to the player terminals the set of random numbers as externally-generated random numbers. In response, the player terminal executes software application programs corresponding to a plurality of games to determine the result of the selected game independent of player participation at other ones of the player terminals. Finally, the central controller updates the participating player's account file according to the result of the games from the player terminal.

Both the foregoing general description and the following detailed description are exemplary and explanatory, and are intended to provide further explanation of the claimed invention.

BRIEF DESCRIPTION OF THE DRAWINGS

The accompanying drawings, which are incorporated in and constitute a part of the specification, illustrate presently preferred implementations of the invention. Together with the general description given above and the detailed description of the preferred embodiments given below, the drawings explain the principles of the invention.

In the drawings.

DETAILED DESCRIPTION OF THE INVENTION

Reference will now be made in detail to the construction and operation of preferred implementations of the present invention illustrated in the accompanying drawings. In those drawings, like elements and operations are designated with the same reference numbers when possible.

The following description of the preferred implications of the present invention is only exemplary of the invention. The present invention is not limited to these implementations, but may be realized by other implementations.

Figure 1:
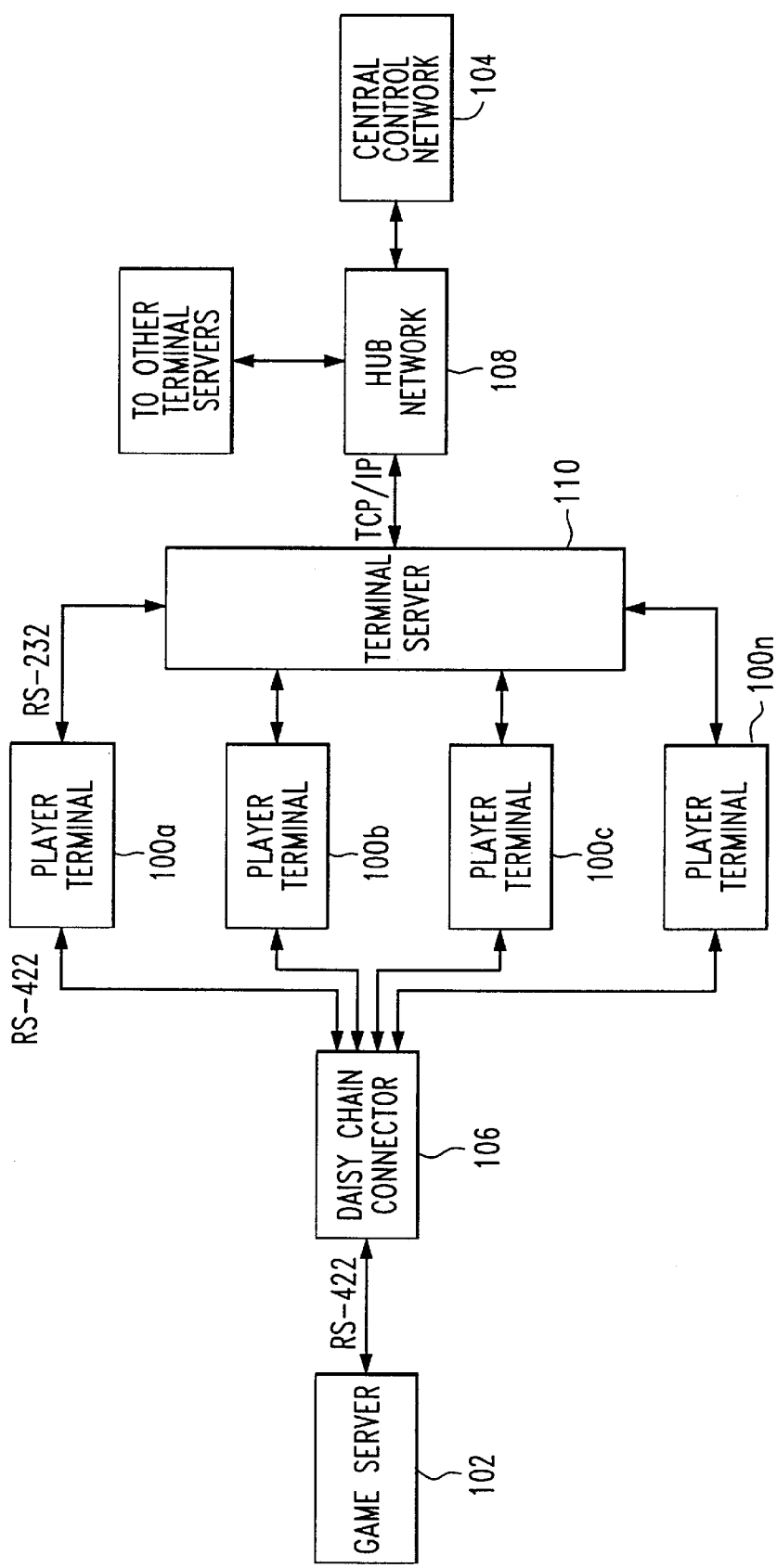
FIG. 1 is a block diagram of a system for operating several electronic games for several players in accordance with one embodiment of the present invention.

FIG. 1 shows a block diagram of a coinless video game system in accordance with a preferred embodiment of the present invention. As shown, the system generally comprises a plurality of player terminals 100a–100n, a game server 102 connected to each of the player terminals 100a–100n, and a central control network 104 connected to each player terminal for administering and controlling the player terminals 100 and for maintaining player accounts. Game server 102 preferably connects to the player terminals 100 via a daisy-chain connection 106 and communicate via the RS-422 protocol. The central control network 104 connects to each player terminal 100 via a hub network 108 and a terminal server 110.

In a preferred embodiment, the system also includes a terminal server 110 connected to each player terminal 100 and communicates via the RS-232 protocol. Terminal server 110 converts information from the player terminals 100 to the TCP-IP protocol and communicates the converted messages to the central control network 104 via the hub network 108. Hub network 108 preferably comprises an Ethernet network.

As shown in FIG. 1, a group of player terminals 100a–100n are serviced by a single game server 102 and a single terminal server 110. In a preferred embodiment, a single game server 102 and single terminal server 110 service up to thirty-two player terminals. Additional groups of player terminals (not shown) are connected to the central control network 104 via the hub network 108. As with the group of player terminals 100a–100n, any additional groups of player terminals are also preferably serviced by a single game server and are connected to the hub network via a single terminal server. Thus, in accordance with the present invention, a gaming system may comprise hundreds or thousands of player terminals. A single game server and a single terminal server service a group of player terminals, and central control network 104 controls all the groups of player terminals.

Figure 2:
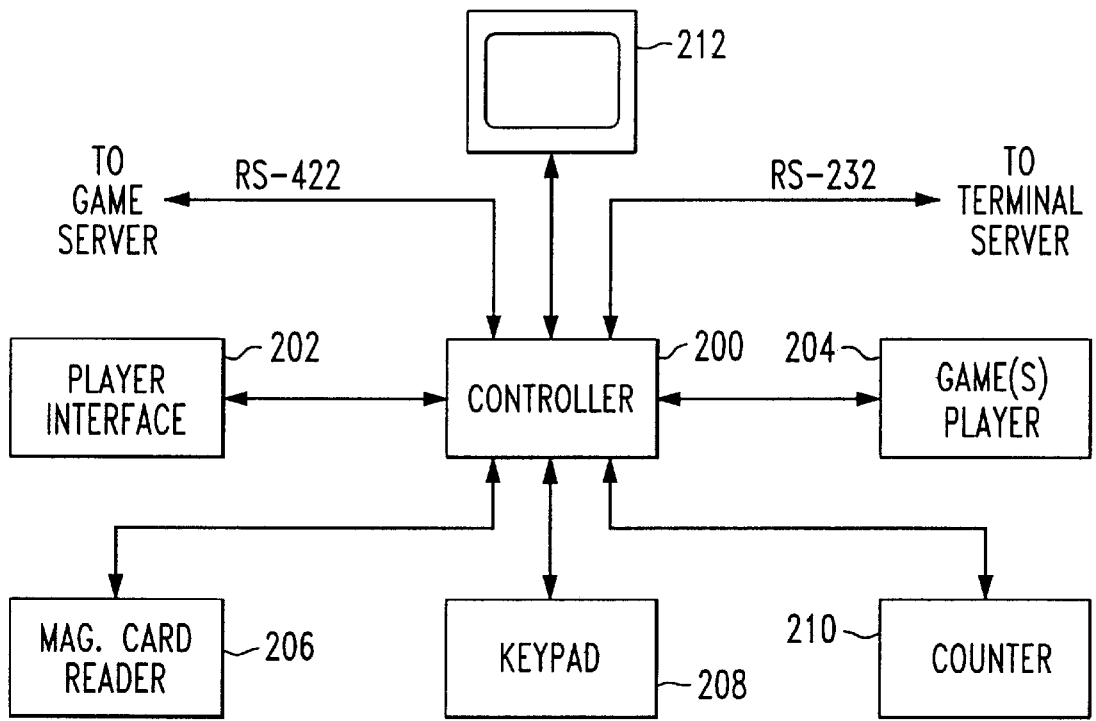
FIG. 2 is a block diagram of a player terminal in accordance with one embodiment of the present invention.

FIG. 2 illustrates a block diagram of a player terminal 100 in accordance with one embodiment of the present invention. Player terminals 100 differ from conventional electronic slot machine-type video game terminals because they do not receive coins and do not pay off winners with coins. Rather, in accordance with a preferred embodiment of the present invention, player terminals 100 accept a magnetic card or key (referred to generically as magnetic card), and communicate with the central control network 104 to debit and credit a player's account based on amounts wagered by the player for each game.

Referring to FIG. 2, player terminal 100 comprises a controller 200, player interface 202, game player 204, magnetic card reader 206, keypad 208, counter 210, and video display 212. Player interface 202 preferably comprises a software application for displaying attract mode graphics to attract a player to the player terminal. Game player 204 preferably comprises software applications running electronic games of chance, such as lotto, keno, bingo, etc. These games are preferably conventional video games of chance except that, as described below, they receive a random number from the external game server 102 and base a win/lose result on that random number and the player's selection. In accordance with the invention, each player terminal 100 plays any one of several games independently of the others. Thus, within a group of player terminals such as player terminals 100a–100n, several players may be playing keno while others play lotto and still others play video poker. Regardless of the game, the player terminals 100 look to the game server 102 for the random number to determine a result.

Magnetic card reader 206 preferably comprises a conventional magnetic card reader capable of reading a credit card—or smart card-type player identification card. The type of card will dictate the type of card reader.

Keypad 208 preferably comprises a conventional alphanumeric or numeric key entry device. Keypad 208 permits a player to enter a personal identification number ("PIN") to verify the player at the player terminal 100.

Video display 212 preferably comprises a conventional touch screen video monitor for displaying video graphics and receiving player inputs. A touch screen is not necessary, however, since player inputs can be made through keypad 208.

The counter 210 preferably comprises a conventional digital counting device for counting a predetermined interval between game plays. The counter 210 helps synchronize operation.

As described above, electronic games of chance rely on randomly generated numbers to determine wins and losses. Although the video games are preferably played by game player 204 at the player terminals, the random number from which the games player 204 determines wins and loses at each player terminal is generated by the game server 102 servicing those player terminals 100.

Figure 3:
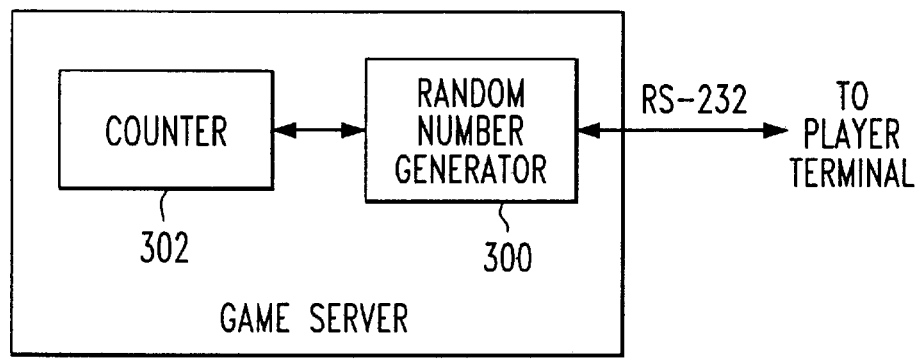
FIG. 3 is a block diagram of a game server in accordance with one embodiment of the present invention.

Thus, as shown in FIG. 3, game server 102 preferably comprises a random number generator 300 and a counter 302. Game server 102 preferably generates random numbers once during a predetermined period, e.g., every few seconds, as determined by counter 302. During a given predetermined period, if a players at player terminal 100 enters a wager and presses the "Play" button, the player must await the display of the next set of winning numbers. In the meantime, as soon as the "Play" button is selected, player terminal 100 notifies game server 102 and game server 102 enrolls that player terminal 100 in the next game.

Upon expiration of the predetermined period, game server 102 generates a set of random numbers for each type of game offered at player terminals 100 that it services. Game server 102 then sends the set of random numbers corresponding to the selected game at enrolled player terminal 100. Player terminal 100 receives the corresponding set of random numbers and determines the win or loss of that game. This eliminates the duplicative need for each player terminal 100 to convert the random number for the particular game being played, and simplifies the programming necessary at player terminal 100.

Each number in the generated set of random number may represent the winning number. For example, if keno is selected at player terminal 100 that is enrolled for the next game, game server 102 generates a set of twenty winning numbers. If the result of the game depends on a graphical figure, for example, Lucky Gem where three consecutive diamonds result in a winning jackpot, a predetermined number represents a certain shape of gem. To ensure proper randomization, however, game server 102 changes randomly or periodically the number corresponding to a certain graphical figure.

In another embodiment consistent with the present invention, game server 102 may generate a single set of random numbers and transmit them to player terminals 100. Player terminals 100 would then convert the single set of random numbers to game-specific numbers corresponding to the selected game at that terminal. This simplifies the tasks at game server 102 by generating only a single set of random numbers regardless of what games are selected at player terminals 100. Additionally, this embodiment alleviates the need for game server 102 to maintain enrollment information of player terminals 100. Player terminals 100 would, however, need to perform additional computation in converting the set of random numbers to game-specific numbers. In any event, the centralization of the random number generation provides an efficient and effective means for controlling the games, increases the average number of games played, and helps reduce fraud.

Because of the predetermined interval between generations of random numbers, a player who makes a "play" during that interval, must wait until that interval expires before the player terminal 100 receives the random number and determines a win or loss for that "play." The interval can, of course, be selected to be any predetermined interval to accommodate players and a provider of the system and games.

Figure 4:
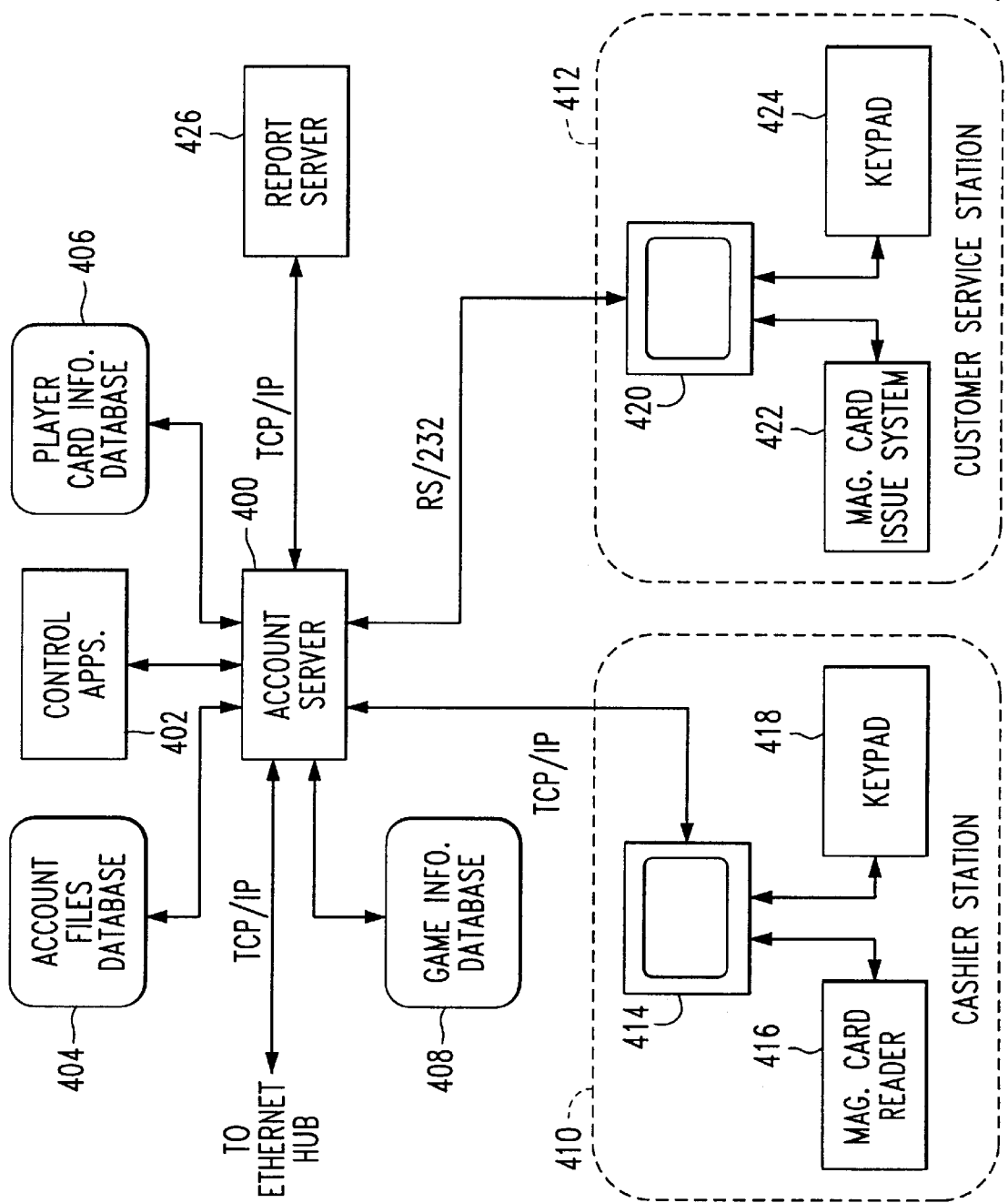
FIG. 4 is a block diagram of a central control network in accordance with one embodiment of the present invention.

In accordance with the present invention, central controller network 104 provides a centralized control means for monitoring and administering all video games and player accounts. Central controller network 104 tracks each player activity, preferably on a per-game basis, to maintain current and comprehensive information about the players at any time during the player's session at player terminals 100. FIG. 4 provides a block diagram of the central control network 104 in accordance with a preferred embodiment of the invention.

Central control network 104 preferably comprises an account server 400 running control applications 402 to provide the administrative and service functions described in this application. Account server 400 stores players' account information in an account files database 404, stores player card information in a player card information database 406, and stores game result information in a game information database 408. In addition, account server 400 preferably controls a cashier station 410 and a customer service station 412.

Cashier station 410 preferably comprises an operator terminal 414, connected to the account server via an Ethernet connection, a magnetic card reader 416, and a keypad 418. Customer service station 412 preferably comprises an operator terminal 420, connected to account server 400 via an RS-232 connection, a magnetic card issue system 422, and a keypad 424. Magnetic card reader 416 and issue system 422 preferably comprise conventional devices for reading and generating credit card-type magnetic cards. Likewise, keypads 418 and 424 preferably comprise conventional alphanumeric or numeric keypads, and terminals 414 and 420 preferably comprise conventional PC or networked data entry terminals.

Although the account server 400 is shown as a single element of the central control to network 104, in a preferred embodiment account server 400 comprises a fault tolerant configured paired STRATUS R55 computer.

In addition to administering games and customer accounts, central control network 104 also provides reports on both using a report server 426. Account server 400 preferably trickles information from its transaction log file in its databases 404, 406, and 408 to the report server 426, which in turn generates customized or standardized reports in accordance with a service providers' requirements. Report server 426 may comprise, for example, a RS-6000 computer and/or an A/S 400. Each entry of the transaction log file preferably contains header information such as message type, transmission number, transaction code, and player account number to identify the type of message and transaction.

The transfer of information from account server 400 to report server 426 preferably occurs in real-time. Although only one physical connection may exist between account server 400 and report server 426, account server 400 may transfer the information in multiple logical units in parallel. This approach is desirable during peak times when transaction volume is high.

At service station 412, a player wishing to use a player terminal 100 can establish an account and receive a magnetic I.D. card to operate the player terminal 100. Preferably, a player provides an operator with some identifying information, and the operator uses terminal 420 to transmit this information to account server 400. Account server 400 establishes an account file for the player in account files database 404 and assigns a corresponding account number to that player. In addition, the operator may ask the customer to select a PIN via keypad 424. The player identifier information, the account number, and an encrypted version of the PIN is then stored on a magnetic strip on a magnetic I.D. card issued by the magnetic card issue system 422. Although not shown, customer service station 412 may also include a scanning device for scanning and storing a player's signature or photograph. Likewise, customer service station 412 may include a camera for photographing the player and including a picture on the player's I.D. card. Account server 400 stores the player's identification information in the player card information database 406. Such information may include the player's name, address, gender, birthday, and phone number. Any scanned information may be stored in a separate file server. Finally, the customer server status 412 may include a printer device to print, for example, customer receipts.

After receiving an I.D. card, the player proceeds to a cashier station 410 to deposit money into his or her account. An operator swipes the card through the magnetic card reader 416 to credit the account via the keypad 418 after receiving payment from the player. Account server 400 stores the player's account information in the account files database 404, preferably including the time, date, and amount of deposit as well as the resulting account balance.

Cashier station 410 also serves to pay players having positive account balances at the end of their play sessions. To receive money, a player provides an operator at cashier station 410 with his/her I.D. card. The operator swipes the I.D. card to retrieve the account balance information verifies the player by requesting the player to input his/her PIN via keypad 418, and pays the player any positive account balance. Account server 400 stores the player's account information in the account files database 404, preferably including the time, date, and amount of withdrawal as well as the resulting account balance. Although shown as two separate stations, cashier station 410 and customer service station 414 may be combined as a single customer service/cashier station.

To help illustrate the operation of the cashless video game system of the present invention a preferred method of operation and system process will now be explained with reference to the system elements in block diagrams in FIGS. 1–4 and the process flow diagram shown in FIGS. 5a and 5b.

Figure 5A:
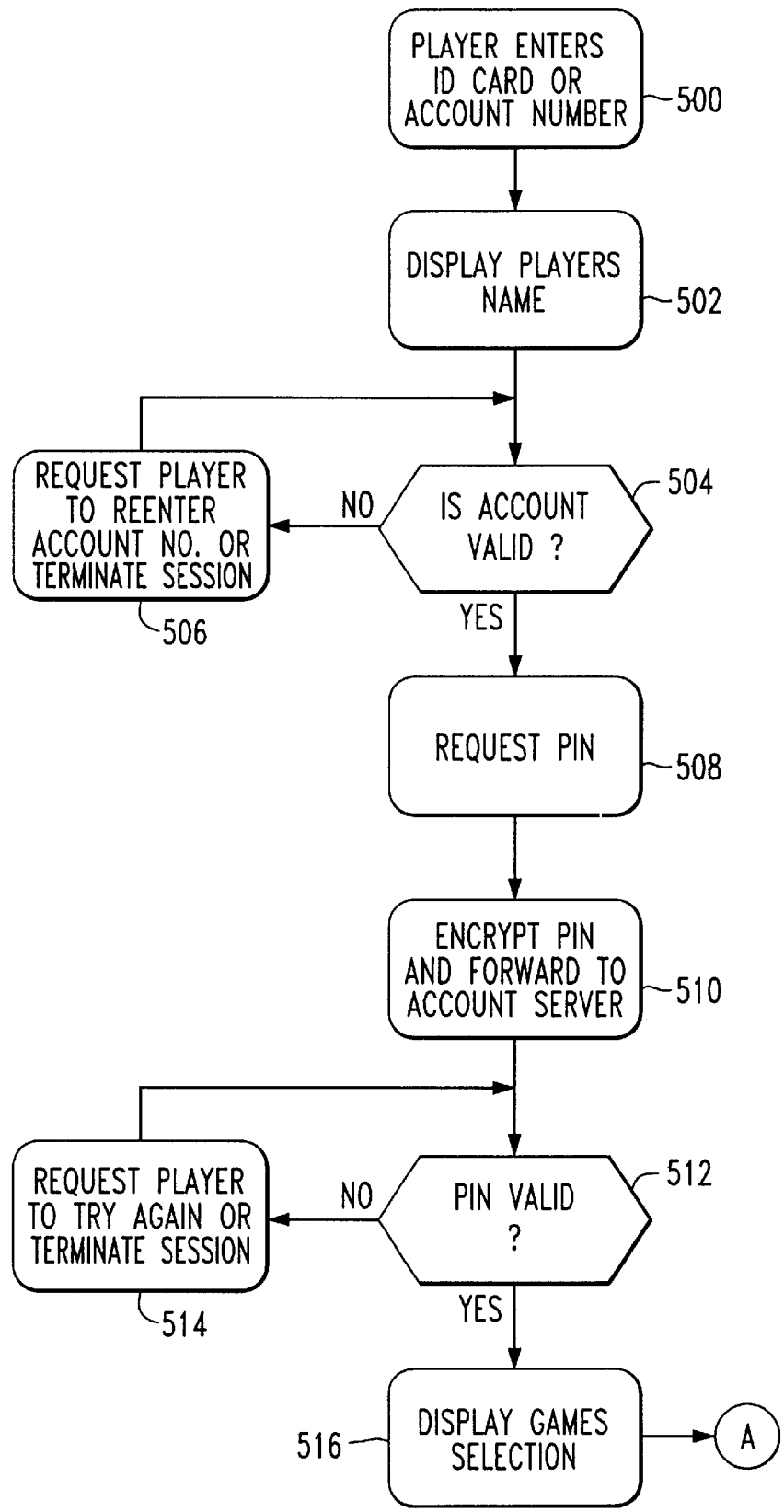
FIGS. 5a and 5b are process flow diagrams illustrating a method of operating a video game system in accordance with one embodiment of the present invention.
Figure 5B:
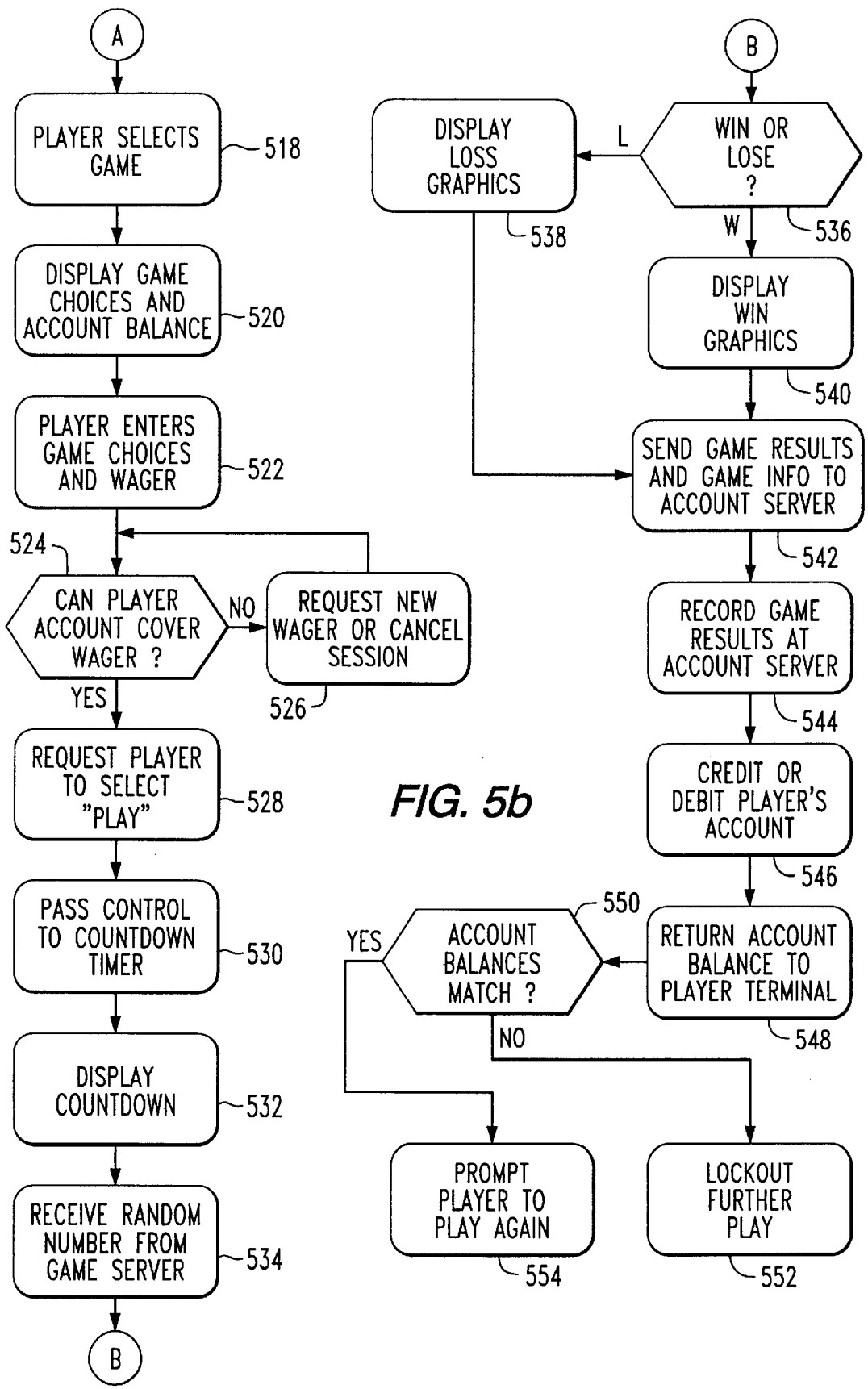

Referring to FIG. 5a, after opening a player account and obtaining a player I.D. card, a player logs onto a player terminal 100 by inserting the I.D. card into the magnetic card reader 206 (step 500). Alternatively, the system does not require player I.D. cards, so the player simply enters his/her assigned player account number using keypad 208.

The player terminal 100, which has been executing attract mode graphics, reads the information from the I.D. card, displays the player's name (step 502) sends the player account number to the account server 400, and requests the account server 400 to verify the player's account number. Account server 400 receives the account number and, referring to the account file database 404, determines whether the player account number is valid (step 504). If not, player terminal 100 informs the player and either requests the player to reenter the account number or terminates the session (step 506).

If account server 400 determines that the account number is valid, player terminal 100 requests the player to enter his/her PIN (step 508). Player terminal 100 preferably encrypts the PIN and forwards the encrypted PIN to the account server 400 (step 510). Account server 400 receives the PIN and determines whether the PIN is valid and corresponds to the player's account number (step 512). If the PIN is not valid or does not correspond to player's account number, player terminal 100 either requests the player reenter the PIN, or terminates the session (step 514). If the PIN is valid, player terminal 100 displays a graphical selection of video games on video display 212 (step 516). As described, the video games may include keno, lotto, bingo, etc.

Using the touch screen video display 212 or keypad 208, the player then selects a desired game (step 518). The player terminal 100 displays the corresponding game graphics and requests the player to enter game choices corresponding to that game (step 520). For a particular game, a player may have to make certain selections required by the rules of each game including a selection of predetermined numbers, colors, and/or symbols. For example, if the player selects keno, video display 212 may display eighty numbers from which the player selects up to twenty numbers via the video display screen 212. Player terminal 100 also displays the account balance during a player session.

The player then enters his/her game choices and a wager amount (step 522). In a preferred embodiment, video display 212 also displays the wager amount during each game. Player terminal 100 responds to the waged amount by requesting the account sever 400 to verify that the player has a sufficient balance in his/her account to cover the wager.

When the account server 400 receives this request from the player terminals it makes the requested determination (step 524). If the player has insufficient funds to cover the wager, the player terminal 100 so informs the player and either requests the player to enter a new wager consistent with the player's account balance or terminates the session (step 526). If account server 100 determines that the account balance is sufficient to cover the wager, player terminal 400 informs the player that he/she is authorized to play and requests the player to select a "play" button on the video display 212 or keypad 208 (step 528). Once the player selects the "play" button, player terminal 100 passes control to counter 210 (step 530) and waits to receive a random number from the corresponding game server 102.

Again, as explained above, because game server 102 is generating a random number at a predefined interval, the player who has selected the "play" button during the interval must wait until the player terminal 100 receives the random number to determine the results of the play. Counter 210 in player terminal 100 keeps track of this interval and, in one embodiment, may display the time remaining between the player's selection of the "play" button and the determination of a win or loss (step 532).

As explained above, at the end of the interval, game server 102 generates a set of random numbers corresponding to each of the plurality of games at player terminals 100. Game server 102 transmits to each corresponding player terminal 100 the set of random numbers corresponding to the game being played at player terminal 100. Player terminal 100 receives the random number from the game server (step 534) and determines whether the player has won or lost that game (step 536). If the player has lost, player terminal 100 displays preselected loss graphics explaining the losing results (step 538). If the player wins, player terminal 100 displays preselected win graphics explaining the winning results (step 540).

Win or lose, player terminal 100 sends the game result and game information to account server 400 (step 542). Such information may include, for example, the player terminal number, game type code, game number, time, date, wager amount and resulting account balance. In accordance with certain requirements, some or all of this information may be encrypted in accordance with conventional encrypting techniques. As described below, player terminal 100 also maintains the player's account balance during a player session.

The account server 400 responds to the data from the player terminal 100 by recording the game information in the game information database 408 (step 544) and crediting or debiting the player's account the waged amount (step 546). Account server 400 then preferably returns the updated account balance to the player terminal 100 (step 548). Player terminal 100 determines whether the returned account balance matches the account balance being tracked by the player terminal 100 (step 550). This additional monitoring of the player's account balance helps protect the game service provider and the player by reducing fraud and detecting balance inconsistencies as early as possible, ideally on a per-game basis. If the account balances do not match, the player terminal 100 may prevent the player from continuing, and request service assistance (step 552). If the account balances match, player terminal 100 preferably prompts the player to choose whether to play again (step 554).

When a player has finished playing, he/she exits the player terminal using an appropriate touch screen command on video display 212 or key on the keypad 208 and returns to the cashier station 410 to settle his/her account. As described, using cashier terminal 414, a cashier (not shown) requests the player account information from the account server 400 and redeems the balance of the player's account to the player.

In the preferred embodiment consistent with the present invention, player terminals 100 transmit real-time to account server 400 all player activity information input by the player. This information may include, for example, the player's account number, information on the game played, and the game choices selected by the player, the wager amount, the winning numbers provided by the game server 102, and a credit or debit request for crediting or debiting the player's account the wager amount. Account server 400 stores player activity information at account files database 404 and player card information database 406. The player card information includes player demographics data such as age, gender, and geographic location. Accordingly, central controller network 104 maintains a current and comprehensive player activity information and demographics of each player, which may be accessed at any time by authorized personnel.

Report server 426 may provide a report of varying specificity including a detailed listing of an individual player's activity for a specified time period, a summary of a player's activity over a period of time, actual number of games played by each player, and a summary of all players' activity on a particular day or over a period of time. Report server 426 generates these reports periodically, for example, once every two minutes. Server 426 may then generate a player activity report outlining player gambling habits such as frequency of plays, favorite games, nomination of player terminals, and average amount of wagers. Such player tracking report is valuable to casinos and players. Based on such reports, for example, casinos may tailor the types, number, and wager amount of games offered at player terminals 100 to accommodate player demand. Player terminals 100 may be modified periodically or interactively based on current player demand.

Additionally, casinos may use the reports as a tool to identify players with certain characteristics for marketing purposes. One marketing tool may be to offer "free play" cards, which are unique player cards with non-redeemable, playable credits. Such cards may be used as an incentive to attract players to the casino. Casinos may also offer complimentary "free play" cards to players who spend a certain weekly amount playing games. Player's account number along with expiration date and time of the free play cards may be printed on the card. Upon expiration such date and time, player terminals 100 will not recognize the free play card. Additionally, casinos may program cashier stations 410 to restrict withdrawals on the free play cards to only amounts greater than the face value of the card. The redemption period may also be restricted, for example, as a predetermined number of days after the expiration date.

Central tracking of all player activity on a per-game basis helps better tailor player terminals 100 based on player use and demand, reduce fraud, and target marketing efforts to players with certain attributes. Additionally, instantaneous information provides greater flexibility for managing gaming establishments. For example, such information may enable gaming establishment to access information whether player habits qualify for special awards during the play. It also helps detect fraud while it is occurring, for example, by detecting wins that far exceed average statistical odds or a single player playing at multiple player terminals 100 simultaneously. Moreover, real-time maintenance of player activity enables accurate system recovery in emergency situations such as power outage.

This description describes the presently preferred embodiments and methods of the present invention, but those skilled in the art would recognize that various changes and modifications may be made, and equivalents may be substituted without departing from the scope of the invention.

For example, the figures and description include a game server as a separate device for generating random numbers for the player terminals associated with that game server. Each player terminal could also maintain its own random number generator. In this embodiment, the random number generators in each player terminal would preferably be synchronized to provide a random number at a predetermined interval, just as described above for the separated random number generator in a game server. A random number generator could also be provided in the central control network 104 rather than in a separate game server.

In addition, many modifications may be made to adapt a particular element, technique or implementation to the teachings of the present invention without departing from the scope of the invention. Therefore, this invention should not be limited to the particular embodiments and methods disclosed herein, but that the invention include all embodiments falling within the scope of the appended claims.

We claim:

1. A game system for operating several games for a plurality of players, comprising:

a plurality of player terminals coupled together, each terminal including
  means for receiving player identification information from a participating one of the players,
  means for receiving game selection information from the participating player indicating one of the plurality of games,
  a video display for displaying a selected one of the games to the participating player, and
  means for executing software application programs, said application programs corresponding to a plurality of games in response to an externally-generated set of random numbers to determine the result of the selected game independent of player participation at other ones of the player terminals;

a game server, connected to the plurality of player terminals, and including
  means for sending to the player terminals the set of random numbers as externally-generated random numbers; and a central controller, connected to each of the plurality of player terminals, and including
  means for storing player account information for each of the players, and
  means for adjusting the account information of the players according to the result of the games from the player terminal.

2. The system of claim 1, wherein the adjusting means includes means for crediting a player's account when the player wins the selected game of chance, and
 means for debiting the player's account when the player loses the selected game of chance.

3. The system of claim 1, wherein the player terminal includes means for sending to the game server the game selection information.

4. The system of claim 3, wherein the player terminal includes means for notifying the game server to enroll the player terminal for the next game.

5. The system of claim 3, wherein the game server includes means for receiving from the player terminal the game selection information,
 means for generating sets of random numbers, each set corresponding to a different one of the plurality of games of chance, and
 wherein the sending means of the game server further includes
  means for sending to the player terminals the set of random numbers corresponding to the game selection information.

6. The system of claim 5, wherein the game server includes means for generating the sets of random numbers representing game-specific winning numbers.

7. The system of claim 5, wherein the game server includes
means for generating the sets of sets of random numbers representing game-specific winning graphical figures.

8. The system of claim 7, wherein the game server further includes
means for changing the numbers representing the winning graphical figures.

9. The system of claim 3, wherein the game server includes
means for receiving from the player terminal the game selection information, and
means for generating the set of random numbers; and
wherein the player terminal includes
means for converting the set of random numbers into game-specific numbers corresponding to the game selection information.

10. A method of operating games comprising the steps of:
establishing a player account file at a central controller for a participating player;
receiving, at a player terminal coupled to the central controller, player identification information input by the participating player;
displaying, on a video display of the player terminal, a plurality of games of chance;
receiving, at the player terminal, information for a selected one of the plurality of games;
sending, by a game server, to the player terminal an externally-generated set of random numbers;
executing software application programs corresponding to the selected game by the player terminal in response to the externally-generated set of random numbers to determine the result of the selected game independent of player participation at other ones of the player terminals; and
updating, by the central controller, the participating player's account file according to the result of the games from the player terminal.

11. The method of claim 10, wherein the step of updating the player's account includes the steps of
crediting the player's account file when the player wins the selected game of chance, and
debiting the player's account file when the player loses the selected game of chance.

12. The method of claim 10, further including the step of sending, by the player terminal, to the game server the game selection information.

13. The method of claim 12, further including the step of notifying the game server by the player terminal to enroll the player terminal for the next game.

14. The method of claim 12, further including the steps of
receiving, by the game server, from the player terminal the game selection information.
generating sets of random numbers by the game server, each set corresponding to a different one of the plurality of games of chance, and
wherein the sending step further includes the substep of sending, by the game server, to the player terminals the set of random numbers corresponding to the game selection information.

15. The method of claim 14, wherein the generating step includes the substep of generating the sets of random numbers representing game-specific winning numbers.

16. The method of claim 14, wherein the generating step includes the substep of
generating the sets of random numbers representing game-specific winning graphical figures.

17. The method of claim 16, further including the step of
changing, by the game server, the numbers representing the winning graphical figures.

18. The method of claim 12, further including the steps of
receiving, by the game server, from the player terminal the game selection information,
generating the set of random numbers by the game server, and
converting, by the player terminal, the set of random numbers into game-specific numbers corresponding to the game selection information.

19. A player terminal capable of executing a plurality of games of chance the terminal comprising:
means for receiving player identification information from a participating player,
means for receiving game selection information from the participating player indicating one of the plurality of games of chance;
means for sending the game selection information;
a video display for displaying to the participating player a display corresponding to the game selection information;
means for receiving a set of random numbers corresponding to the game selection information;
means for executing a game corresponding to the game selection information using the received set of random numbers to determine the result of the game independent of player participation at other player terminals; and
means for transmitting to a central controller information about the participating player and about the game, including results of the game.

20. The system of claim 19, wherein the player terminal further includes
means for receiving from the player a wager amount.

21. A game server for a video game system comprising:
means for establishing a predetermined interval;
means for generating a plurality of sets of random numbers once during each predetermined interval, each set corresponding to a different type of game of chance;
means for receiving from a player terminal game selection information; and
means for sending to a player terminal the set of random numbers corresponding to the game selection information for use by a player terminal to determine the result of the selected game independent of player participation at other player terminals.

22. The game server of claim 21, wherein the generating means includes
means for generating the sets of random numbers representing game-specific winning numbers.

23. The game server of claim 21, wherein the generating means includes
means for generating the sets of random numbers representing game-specific winning graphical figures.

24. The game server of claim 23, further including
means for changing the numbers representing the winning graphical figures.

25. A game server for a video game system comprising:
means for establishing a predetermined interval;
means for generating a set of game-independent random numbers once during each predetermined interval; and means for sending to a player terminal the set of game-independent random numbers during each predetermined interval for use by a player terminal, wherein a player terminal executes the game by converting the set of game-independent random numbers to a set of game-specific numbers corresponding to the type of game selected by a player.

26. A game system having central player tracking for a plurality of players, comprising:

a plurality of player terminals coupled together, each terminal including means for receiving player identification information from a participating one of the players, means for receiving game selection information from the participating player indicating one of the plurality of games, a video display for displaying a selected one of the games to the participating player, means for receiving a wager amount from the participating player.

means for executing a software application program for a game corresponding to the game selection information, and means for transmitting player activity information after each game for which the wager amount was received from the participating player, the player activity information including the result of the game and the wager amount; and a central controller, connected to each of the plurality of player terminals, and including means for storing player account information for each of the players, means for receiving from the player terminals the transmitted player activity information after each game for which the wager amount was received, and means for adjusting the account information of the players according to the player activity information after each game for which the wager amount was received.

27. The system of claim 26, wherein the adjusting means includes means for crediting the player's account when the player wins the selected game of chance, and means for debiting the player's account when the player loses the selected game of chance.

28. The system of claim 26, wherein the central controller includes means for generating a report of the player activity information.

29. The system of claim 26, wherein the central controller includes means for issuing player awards during the player's game using player activity information.

30. The system of claim 26, wherein the central controller includes means for issuing free play cards using the player activity information.

31. The system of claim 30, wherein the central controller includes means for invalidating free play cards after a predetermined period.

32. The system of claim 30 wherein the central controller includes means for modifying the plurality of games offered at player terminals using player activity information.

33. The system of claim 30, wherein the central controller includes means for detecting wins exceeding an average statistical odds.

34. The system of claim 30 wherein the central controller includes means for detecting simultaneous play at multiple player terminals by a single player.

35. A method of operating games in a system with central player tracking comprising the steps of:

establishing a player account file at a central controller for a participating player, receiving, at a player terminal coupled to the central controller, player identification information input by the participating player;

displaying, on a video display of the player terminal, a plurality of games of chance, receiving, at the player terminal, information for a selected one of the plurality of games including a wager amount from the participating player;

executing a software application program by the player terminal for a game corresponding to the game selection information to determine the result of the game;

transmitting, by the player terminal, player activity information after each game for which the wager amount was received from the participating player, the player activity information including the result of the game and the wager amount; and updating, by the central controller, the participating player's account file according to the result of the game and the player activity information after each game for which the wager amount was received.

36. The method of claim 35, wherein the step of updating the player's account includes the steps of crediting the player's account file when the player wins the selected game of chance, and debiting the player's account file when the player loses the selected game of chance.

37. The method of claim 35, wherein the updating step includes the step of generating a report of the player activity information.

38. The method of claim 35, wherein the updating step includes the step of issuing, by the central controller, player awards during the player's game using player activity information.

39. The method of claim 35, further including the step of issuing, by the central controller, free play cards using the player activity information.

40. The method of claim 35, further including the step of invalidating, by the central controller, free player cards after a predetermined period.

41. The method of claim 35, further including the step of modifying, by the central controller, the plurality of games offered at player terminals using player activity information.

42. The method of claim 35, further including the step of detecting, by the central controller, wins exceeding an average statistical odds.

43. The method of claim 35, further including the step of detecting, by the central controller, simultaneous play at multiple player terminals by a single player.

44. A central controller for a game system with central player tracking comprising:

means for communicating with each of a plurality of player terminals;

means for storing player account information for all players at the player terminals;

means for receiving, from the player terminals, player activity information after each game for which a wager amount was received by the player terminals, the player activity information including the result of the game and the wager amount; and means for adjusting the player account information of each of the players according to the player activity information received after each game for which the wager amount was received by the player terminals.

45. The central controller of claim 44, wherein the adjusting means includes means for crediting the player's account when the player wins the selected game of chance, and means for debiting the player's account when the player loses the selected game of chance.

46. The central controller of claim 44, further including means for generating a report of the player activity information.

47. The central controller of claim 44, further including means for issuing player awards during the player's game using player activity information.

48. The central controller of claim 44, further including means for issuing free play cards using the player activity information.

49. The central controller of claim 44, further including means for invalidating free player cards after a predetermined period.

50. The central controller of claim 44, further including means for modifying the plurality of games offered at player terminals using player activity information.

51. The central controller of claim 44, further including means for detecting wins exceeding an average statistical odds.

52. The central controller of claim 44, further including means for detecting simultaneous play at multiple player terminals by a single player.

* * * * *

UNITED STATES PATENT AND TRADEMARK OFFICE
CERTIFICATE OF CORRECTION

| | |
|---|---|
| PATENT NO. | : 6,280,328 B1 |
| APPLICATION NO. | : 08/877375 |
| DATED | : August 28, 2001 |
| INVENTOR(S) | : Neils C. Holch and Frank J. Riolo |

It is certified that error appears in the above-identified patent and that said Letters Patent is hereby corrected as shown below:

At column 1, line 5, the sentence "This application is a continuation-in-part of U.S. patent application Ser. No. 08/719,651, filed Sep. 25, 1996, now U.S. Pat. No. 5,674,128, the contents of which are hereby incorporated by reference." should read --This application claims benefit under 35 USC Section 120 as follows: this application is a continuation-in-part of U.S. patent application Ser. No. 08/719,651, filed Sep. 25, 1996, now U.S. Pat. No. 5,674,128, which is a continuation of U.S. patent application Ser. No. 08/391,509, filed February 21, 1995, now abandoned; the contents of the 08/719,651 patent application are hereby incorporated by reference.--.

Signed and Sealed this

Third Day of July, 2007

JON W. DUDAS
*Director of the United States Patent and Trademark Office*